(12) United States Patent
Toronjo et al.

(10) Patent No.: US 12,202,244 B2
(45) Date of Patent: *Jan. 21, 2025

(54) ARTICLE OF APPAREL

(71) Applicant: Under Armour, Inc., Baltimore, MD (US)

(72) Inventors: Alan Toronjo, Portland, OR (US); Daniel Lee, Hong Kong (CN); Roger Fan, Hong Kong (CN); Thomas White, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,463

(22) Filed: Jun. 16, 2023

(65) Prior Publication Data

US 2023/0405970 A1 Dec. 21, 2023

Related U.S. Application Data

(63) Continuation of application No. 17/563,939, filed on Dec. 28, 2021, now Pat. No. 11,701,862, which is a
(Continued)

(51) Int. Cl.
*A41H 43/02* (2006.01)
*A41H 43/00* (2006.01)
(Continued)

(52) U.S. Cl.
CPC .............. *B32B 7/09* (2019.01); *A41H 43/005* (2013.01); *A41H 43/02* (2013.01);
(Continued)

(58) Field of Classification Search
CPC ............ A41H 43/0214; A41H 43/0207; B29C 55/023
See application file for complete search history.

(56) References Cited

U.S. PATENT DOCUMENTS

| 3,183,868 A | 5/1965 | Shotsky |
| 4,103,058 A | 7/1978 | Humlicek |

(Continued)

FOREIGN PATENT DOCUMENTS

EP 604731 A1 7/1994

*Primary Examiner* — Tajash D Patel
(74) *Attorney, Agent, or Firm* — Edell, Shapiro & Finnan, LLC

(57) ABSTRACT

An article of apparel includes a composite material. The composite material includes a pliable first layer and a resilient second layer, where the first and second layers are secured to each other via a patterned strand network. In forming the composite material, the second layer is stretched and maintained under tension while the first layer is secured to the second layer via the patterned strand network. The tension on the second layer is then released, resulting in contraction of the second layer in relation to the first layer and an outward buckling or protrusion of the first layer in relation to the second layer to form protruding cells along the composite material that are bounded by portions of the patterned strand network. The patterned strand network can be formed using embroidery with one or more auxetic patterns in the stitching.

20 Claims, 13 Drawing Sheets

Related U.S. Application Data continuation of application No. 17/129,335, filed on Dec. 21, 2020, now Pat. No. 11,358,367, which is a continuation-in-part of application No. 16/722,213, filed on Dec. 20, 2019, now Pat. No. 12,053,054, and a continuation-in-part of application No. 16/717,605, filed on Dec. 17, 2019, now Pat. No. 11,744,325.

(60) Provisional application No. 62/951,003, filed on Dec. 20, 2019, provisional application No. 62/782,423, filed on Dec. 20, 2018.

(51) Int. Cl.
   *B29C 55/02* (2006.01)
   *B32B 5/02* (2006.01)
   *B32B 5/26* (2006.01)
   *B32B 7/05* (2019.01)
   *B32B 7/09* (2019.01)

(52) U.S. Cl.
   CPC ..... *A41H 43/0207* (2013.01); *A41H 43/0214* (2013.01); *B29C 55/023* (2013.01); *B32B 5/026* (2013.01); *B32B 5/26* (2013.01); *B32B 7/05* (2019.01); *B32B 2437/00* (2013.01); *B32B 2437/02* (2013.01)

(56) References Cited

U.S. PATENT DOCUMENTS

| | | | |
|---|---|---|---|
| 4,349,020 | A | 9/1982 | Krikorian |
| 4,720,415 | A | 1/1988 | Vander Wielen et al. |
| 4,761,324 | A | 8/1988 | Rautenberg et al. |
| 5,707,709 | A | 1/1998 | Blake |
| 5,882,769 | A | 3/1999 | McCormack et al. |
| 5,907,872 | A | 6/1999 | Alberts et al. |
| 6,589,638 | B1 | 7/2003 | McCormack et al. |
| 7,834,236 | B2 | 11/2010 | Middlesworth et al. |
| 9,469,091 | B2 | 10/2016 | Henke et al. |
| 11,358,367 | B2 | 6/2022 | Toronjo et al. |
| 11,701,862 | B2* | 7/2023 | Toronjo ................ B29C 55/023 112/475.04 |
| 2004/0121687 | A1* | 6/2004 | Morman ................ B29C 55/06 442/329 |
| 2006/0083900 | A1 | 4/2006 | Ashraf |
| 2006/0135024 | A1 | 6/2006 | Thomas |
| 2013/0124310 | A1 | 5/2013 | Barbieri et al. |
| 2014/0023829 | A1 | 1/2014 | Broering et al. |
| 2014/0101816 | A1 | 4/2014 | Toronjo |
| 2014/0330232 | A1 | 11/2014 | Schonbeck et al. |
| 2017/0340037 | A1 | 11/2017 | Bailey et al. |

\* cited by examiner

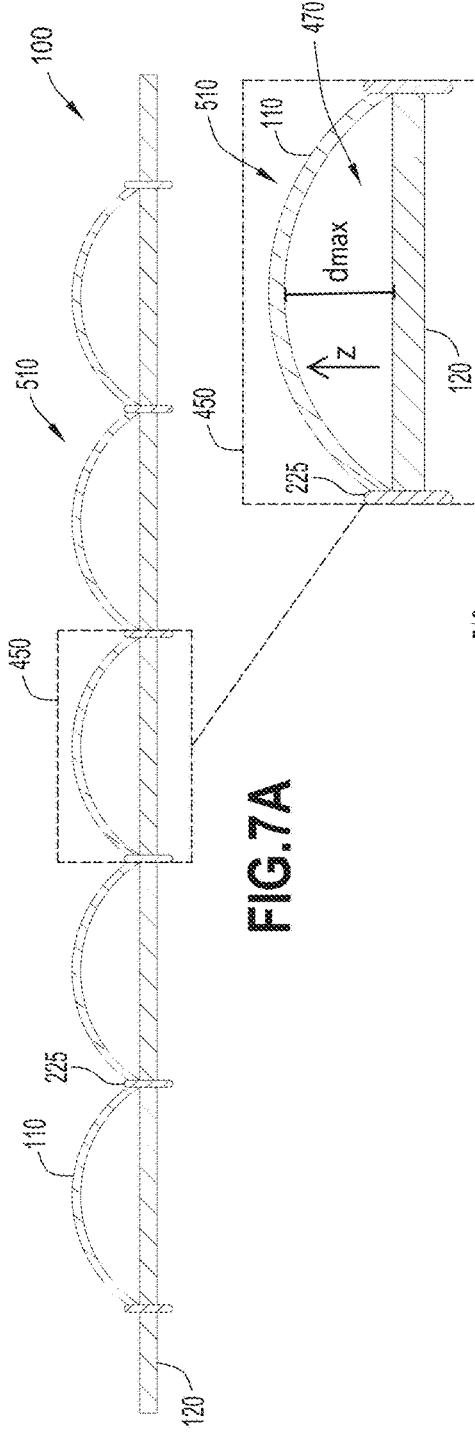
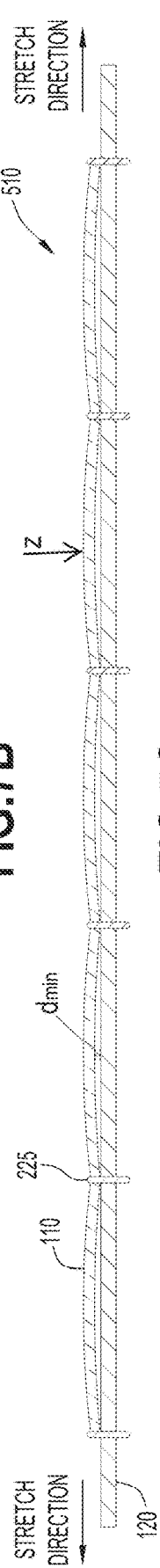
FIG.7A
FIG.7B
FIG.7C

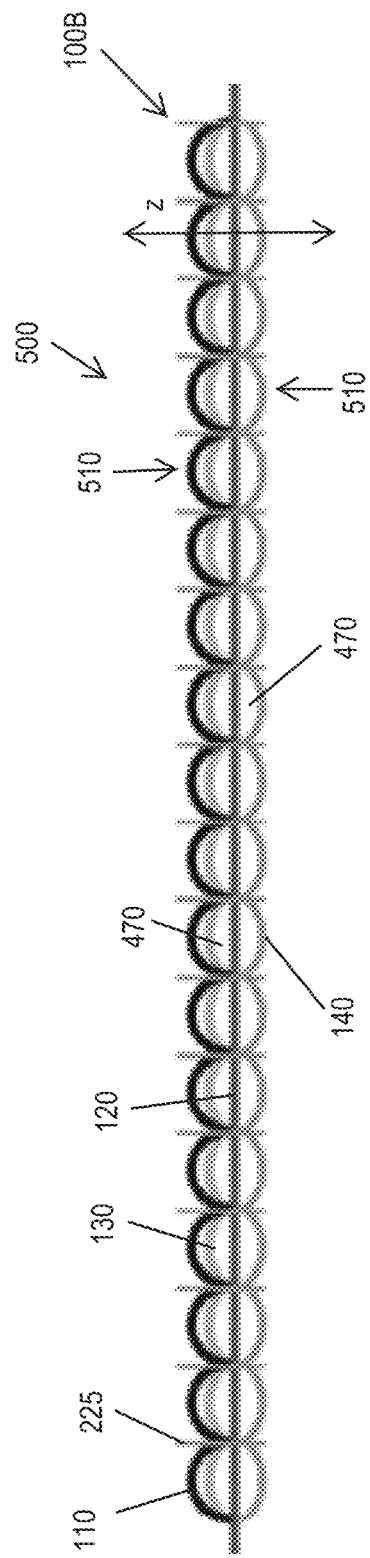

ARTICLE OF APPAREL

CROSS-REFERENCE TO RELATED APPLICATIONS

This application is a continuation of U.S. patent application Ser. No. 17/563,939, filed Dec. 28, 2021, which is a continuation of U.S. patent application Ser. No. 17/129,335, filed Dec. 21, 2020, which claims priority from U.S. Provisional Patent Application Ser. No. 62/951,003, filed Dec. 20, 2019, and further is a continuation-in-part of U.S. patent application Ser. No. 16/717,605, filed Dec. 17, 2019, and a continuation-in-part of U.S. patent application Ser. No. 16/722,213, filed Dec. 20, 2019, both of which claim priority from U.S. Provisional Patent Application Ser. No. 62/782,423, filed Dec. 20, 2018, the disclosure of each of the aforementioned applications is incorporated herein by reference in its entirety.

FIELD OF THE INVENTION

The present invention relates to a method of forming an article of apparel.

BACKGROUND

Apparel such an article of footwear can be designed to provide a variety of features in the upper and sole structure depending upon a particular application. Some features that are desirable are comfort, breathability, durability, stretchability and sufficient support and protection for the user's foot when the shoe is worn for a particular application. For certain applications, it may also be desirable to control a degree of stretch in one or more directions along the upper during use. Controlling a degree of stretch and providing a comfortable fit is also important for other textile articles, including articles of apparel.

It would be desirable to provide a textile article that is lightweight, breathable, and durable, and further provides enhanced levels of stretchability at different locations of the textile article depending upon a particular application of use.

SUMMARY OF THE INVENTION

In example embodiments, an article of apparel comprising a composite material is formed by orienting a first layer with a second layer such that a second stretch value of the second layer is greater than a first stretch value of the first layer in a stretch direction. Tension is applied to stretch the second layer in the stretch direction from an original dimension to a stretched dimension, and the first layer is secured to the second layer via a stitch network while the second layer is under tension. The stitch network forms a plurality of enclosed cells located between the first and second layers, with each enclosed cell being defined by a perimeter of stitches of the stitch network. The applied tension is then released, allowing the second layer to retract from its stretched dimension so as to form a composite material. The composite material is incorporated into an article of apparel.

In a further embodiment, the composite material is a multilayered textile comprising a non-resilient first layer (i.e., a fabric with limited stretch and recovery properties) and a resilient second layer (i.e., a fabric possessing stretch and recovery properties). The first layer is secured to second layer via stitching formed of a plurality of strand segments, each strand segment including a first thread positioned on the surface of the first layer and a second thread positioned on the surface of the second layer. The first and second threads extend through the multilayered textile at predetermined locations to interlock with each other. The stitches are organized in a predetermined pattern within the multilayer textile to form a plurality of cells, each cell being enclosed by stitching. The multilayered textile is dynamic, being configured to move from a normal, unstretched or unloaded position to an expanded, stretched or loaded position. In the normal position, the first layer is separated from the second layer within one or more of the cells. In the expanded position, the first layer contacts the second layer within one or more of the cells.

In certain embodiments, the dynamic composite material comprises a pliable first layer (e.g., the first layer having a two-way stretch) and a resilient second layer (e.g., the second layer having a four way stretch), where the first and second layers are secured to each other via a patterned stitch or strand network to define a plurality of dynamic cells. In forming the composite material, the second layer is stretched and maintained under tension while the first layer is secured to the second layer via the stitch network. After securing the first and second layers together, the tension on the second layer is released, resulting in contraction of the second layer in relation to the first layer and an outward buckling or protrusion of the first layer in relation to the second layer. Specifically, each cell is driven upward (along the z-axis) from a first position, in which the first layer is in contact with the second layer within the confines of the stitched cell, to a second position, in which the first layer is separated from the second layer within the cell confines (as defined by the stitching). With this configuration, an array of protruding cells is formed along the composite material in a dynamic state, with each cell being bounded by portions of the patterned strand network. When the formed composite material is stretched in use, the cells collapse or flatten toward the second layer to a static state. The patterned strand network, as described herein, can comprise an embroidered network that is formed with one or more auxetic patterns in the stitching, where the auxetic patterns enhance the stretchability of the composite material when integrated within the upper. Alternatively, the stitch network can also be any suitable stitching that facilitates the formation of individual cells based upon the pattern of stitches formed along the layers forming the composite material.

In other embodiments, the dynamic composite material formed with a patterned strand network and including dynamic cells can be used to form other textile articles, such as other articles of apparel (e.g., a brassiere, a shirt, shorts, pants, etc.).

Methods of forming the composite material as well as composite materials and articles of apparel are also described herein.

The above and still further features and advantages of the present invention will become apparent upon consideration of the following detailed description of specific embodiments thereof.

BRIEF DESCRIPTION OF THE DRAWINGS

FIG. 7A is a cross sectional view of the composite material in a normal, unloaded or unstretched configuration.

FIG. 7B illustrates the composite structure of FIG. 7A under a first degree of tension or load.

FIG. 7C illustrates the composite structure of FIG. 7A under a maximum degree of tension or load, causing lockout.

FIG. 13 is a cross-sectional view of the composite material including the package of FIG. 1B.

Like reference numerals have been used to identify like elements throughout this disclosure.

DETAILED DESCRIPTION

Figure 1A:
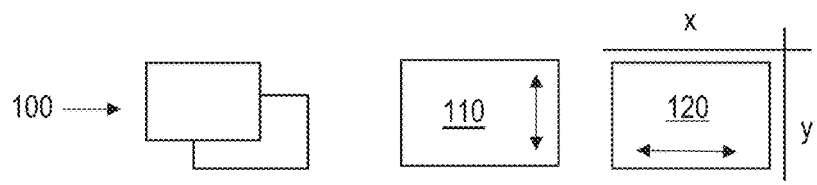
FIGS. 1A, 1B, 1C and 1D are schematic views showing various material layer combinations for forming a composite textile in accordance with embodiments of the invention.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

A composite material as described herein is a textile construction including multiple layers (e.g., at least two layers) that cooperate to form a plurality of discrete, dynamic cells operable to control the expansion pattern of the composite material. The material is resilient—when load or tension is applied, the material moves from a normal, unstretched configuration to an expanded, stretched configuration. The cells, moreover, move from a protruded configuration to a flattened configuration. When the load is released, the material (including the cells) recovers, returning to its normal configuration.

Referring to FIG. 1A, the composite material 100 includes a first or outer layer 110 (also called a pliable layer) and a second or base layer 120 (also called a resilient layer). In other embodiments shown in FIGS. 1B-1D, the composite material 100B, 100C, 100D includes further layers (as described in further detail herein). The specific number and/or types of layers that are used to form a composite material may depend upon a particular application of use for the composite material (e.g., integration of the composite material within a particular article of apparel, such as an article of footwear or shoe, a brassiere, shirts, shorts or pants, or other textile structures).

In an embodiment, the outer layer 110 is a pliable or flexible layer with low, moderate or no stretch and/or recovery properties. For example, the first layer (as well as other layers except for the second layer) can have a recovery of less than 50%. By way of example, the first la90%yer 110 is a synthetic fabric including a substrate and a polymer coating. The substrate can be a nonwoven web or a knit textile. A nonwoven web is an assembly of textile fibers held together by mechanical interlocking in a random web or mat, e.g., by fusing of the fibers (in the case of thermoplastic fibers) or by bonding with a polymer. The fibers may be oriented in one direction or be deposited in a random manner. In an embodiment, the first layer 110 is a spunbonded or spunbond web of entangled strands or fibers impregnated with a polymer to form a substantially continuous, porous structure. The polymer may include polymers such as polyurethane, acrylonitrile-butadiene copolymer, styrene-butadiene copolymer, copolymer of acrylic ester or methacrylic ester, and silicone rubber. In a further embodiment, the first layer 110 can include ultra-fine fibers or microfibers which are impregnated and/or coated with polyurethane. By way of example, the first layer 110 can comprise by weight about 55% polyester microfibers and about 45% polyurethane.

The thickness of the first layer may be any suitable for its described purpose (to buckle or bend upon recovery of the second layer 120). In an embodiment, the thickness of the pliable layer 110 is generally less than 2 mm. By way of example, the thickness can be from about 0.5 mm to about 1.5 mm (e.g., about 0.8 mm) so as to facilitate certain properties for the composite material as described herein. In example embodiments, the first layer 110 forms an outer layer of a textile structure (e.g., an upper for an article of footwear) in which the composite material is integrated.

The second or base layer 120 is a resilient fabric possessing a second stretch and/or recovery value that is greater than that of the first layer 110 and, preferably, better than one or more of any other layers forming the composite material 100, 100A, 100B 100C, 100D. Elongation or stretch is the deformation in the direction of load caused by a tensile force. Elongation may be measured in units of length (e.g., millimeters, inches) or calculated as a percentage of the original length (e.g., a fabric that stretches 100% expands to twice its original length). In particular, an elongation value (also referred to as a stretch value) refers to an amount of elongation of a material in a dimension (length or width) that is defined with the formula: [(elongated dimension−original dimension)/(original dimension)]×100. Recovery (elastic recovery or elasticity) is the ability of a material under load to recover its original size or near original size and shape immediately after removal of the stress that causes deformation. For example, a recovery percentage refers to a percentage of an original dimension to which the material relaxes (i.e., no longer under the load or tension) after being stretched along such dimension (e.g., a recovery percentage of at least 90% of a material indicates that the dimension of the material in the stretch direction after the load is removed will be at least 90% of the original dimension of the material before being stretched).

In an embodiment, the second layer 120 is a power stretch or elastic fabric having the ability to expand under load and regain its original form once the load is removed. In an embodiment, the second layer has a stretch value of at least 100% and a recovery value of greater than 50% and preferably at least 90%. By way of example, the second layer 120 is a knit textile. Knitting is a process for constructing fabric with strands by interlocking a series of loops (bights) of one or more strands organized in wales and courses. In general, knitting includes warp knitting and weft knitting. In warp knitting, a plurality of strands run lengthwise in the fabric to make all the loops. In weft knitting, one continuous strand runs crosswise in the fabric, making all the loops in one course. Weft knitting includes fabrics formed on both circular knitting and flat knitting machines.

The strands forming the second layer may be of any one or more types suitable for the described purpose (to form a shoe upper). The term strand includes a single fiber, filament, or monofilament, as well as an ordered assemblage of textile fibers having a high ratio of length to diameter and normally used as a unit (e.g., slivers, roving, single yarns, plies yarns, cords, braids, ropes, etc.). In a preferred embodiment a strand is a yarn (a continuous strand of textile fibers, filaments, or material in a form suitable for knitting, weaving, or otherwise intertwining to form a textile fabric). A yarn may include a number of fibers twisted together (spun yarn); a number of filaments laid together without twist (a zero-twist yarn); a number of filaments laid together with a degree of twist; and a single filament with or without twist (a monofilament).

The strands forming the textile can be natural strands (e.g., cotton strands, wool strands, silk strands, etc.) and/or synthetic strands formed of one or more types of polymers, including fibers or filaments having one or more polymer components formed within the fibers or filaments.

By way of example, a strand of the textile includes elastic strands and/or inelastic strands. Elastic strands are strands including elastomeric material (e.g., 100% elastic material). Elastic strands, by virtue of their composition alone, are capable of stretching under stress and recovering to its original size once the stress is released. Accordingly, elastic strands are utilized to provide a textile with stretch properties. An elastic strand is formed of rubber or a synthetic polymer having properties of rubber. A specific example of an elastomeric material suitable for forming an elastic strand is elastane, an elastomeric polyester-polyurethane copolymer.

In contrast, an inelastic strand is formed of a non-elastomeric material such natural and/or synthetic spun staple yarns, natural and/or synthetic continuous filament yarns, and/or combinations thereof. By way of specific example, natural, non-elastomeric fibers include cellulosic fibers (e.g., cotton, bamboo) and protein fibers (e.g., wool, silk, and soybean). Synthetic non-elastomeric fibers include polyester fibers (poly(ethylene terephthalate) fibers and poly(trimethylene terephthalate) fibers), polycaprolactam fibers, poly(hexamethylene adipamide) fibers, acrylic fibers, acetate fibers, rayon fibers, nylon fibers and combinations. Accordingly, inelastic strands possess no inherent stretch and/or recovery properties by virtue of composition.

In general, both elastic and inelastic strands may be used in forming a textile layer, with inelastic strands utilized for ground stitches and the elastic strands being inserted and/or knitted into the structure. Accordingly, elastomeric strands are used in combination with inelastic strands. In an embodiment, the proportion of elastomeric fibers in the fabric may include about 50% or more elastomeric strands to provide desired stretch and recovery properties of the fabric. By way of example, the second layer comprises at least 60% (e.g., 68%-72%) elastomeric strands (e.g., elastane) and no more than 40% (e.g., 28%-32%) inelastic strands (e.g., nylon).

Accordingly, the second layer 120 is configured to have high elongation and recovery properties. The elastic or stretch fabric may be a mono-elastic fabric, which stretches in a single, longitudinal or horizontal (crosswise) direction (also called a two-way stretch fabric) or bi-elastic fabric, which stretch in both longitudinal and horizontal directions (also called a four-way stretch fabric). In an embodiment, the second layer is a weft-knitted fabric possessing an elongation (stretch) value in the machine (longitudinal) direction of about 60% and an elongation in the width direction of about 220% (ASTM D4964-96 (R2016)).

The layers forming the composite material 100 may be positioned in a predetermined orientation and, in particular, may be oriented with reference to the dominant stretch axis of the base layer 120. In FIG. 1A (as well as in FIGS. 1B-1D) the double sided arrow provided on each material layer 110, 120 (as well as additional layers 130, 135 and 140) provides an indication of an orientation of a primary or dominant direction or dimension of stretch (also called the dominant stretch axis), i.e., greatest or maximum elongation/stretch and recovery property for the layer. As illustrated, the arrangement of the layers forming the composite material indicates that certain layers have a dominant direction of stretch that are oriented transverse (e.g., orthogonal) in relation to other material layer(s) that are secured together to form the composite material.

As shown in FIG. 1A, the second layer 120 has a primary/dominant or greatest degree of stretch (greatest elongation value) oriented in a horizontal or second direction (also called the width or x-axis direction, as shown by the double arrow oriented on layer 120). It should be understood that the second layer 120 can also have a degree of stretch in a vertical or first direction (i.e., a direction transverse the dominant direction of stretch as shown in FIG. 1A, also called the length or y-axis direction), where the degree of stretch (elongation value) in the vertical direction is less than that in the horizontal (dominant) stretch direction for the second layer. As used herein, the horizontal (second) and vertical (first) directions refer to orientations of a dominant degree of stretch for each layer in relation to all the other layers for each composite material depicted in FIGS. 1A-1D.

In an embodiment, the second or base layer 120 is a power stretch knit textile possessing an elongation value of at least 50% in one or both directions and preferably in a range from about 50% to 200% or greater (e.g., up to about 160% in the dominant elongation or stretch direction (e.g., the width direction), and at least about 50% in the orthogonal direction (the length direction). The second layer 120, furthermore, possesses a recovery value of greater than 90% (e.g., 94% or greater), preferably in both directions.

The second layer 120 can also have any suitable thickness that permits suitable elongation and recovery of the second layer for the intended use of the composite material. In example embodiments, the thickness of the second layer can range from about 0.5 mm to about 2.0 mm.

In an embodiment, the other layers are generally rigid. As explained in greater detail below, in an embodiment, the other layers are firm knits (no/little stretch), moderate knits (less than 25% stretch) or stretch knits (less than 50% stretch). Should these other layers possess a dominant stretch axis that axis may be oriented generally orthogonal to the dominant stretch axis of the base layer 120. As indicated by the double arrows in FIG. 1A-FIG. 1D, the first layer possesses a dominant elongation axis; accordingly, the dominant elongation axis is oriented generally orthogonal to the dominant stretch direction of the base layer 120.

It is further noted that the first layer 110 can also have a stretch property in the same (e.g., horizontal or second) direction as the second layer 120 (e.g., the first layer can have four way stretch properties), but the degree of stretch for the first layer 110 will be less than the degree of stretch for the second layer 120 when in the same (e.g., parallel) direction. The orientation and degree of stretch properties for the first layer 110 in relation to the second layer 120 can also be applicable for further layers (e.g., layers 130, 135 and 140 as shown in the composite material embodiments of FIGS. 1B-1D). Thus, in example embodiments, the layers 110, 120, 130, 135, 140 are secured to each other in a suitable alignment or orientation such that second layer 120 has the greatest degree of elongation/stretch or greatest stretch property in a particular dimension (e.g., horizontal or second or width direction as shown in FIGS. 1A-1D) in relation to other layers of the formed composite material.

Figure 1B:
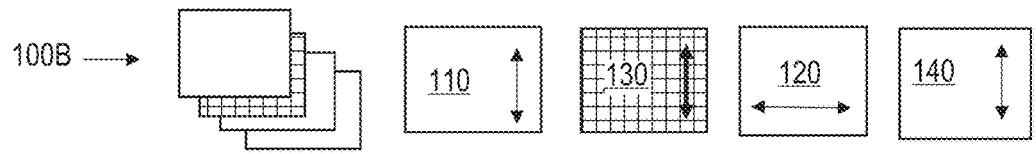
Figure 1C:
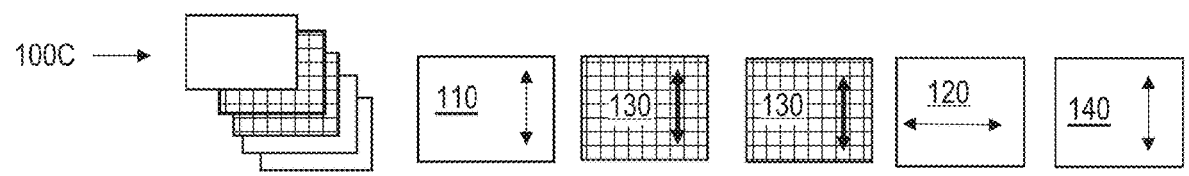
Figure 1D:
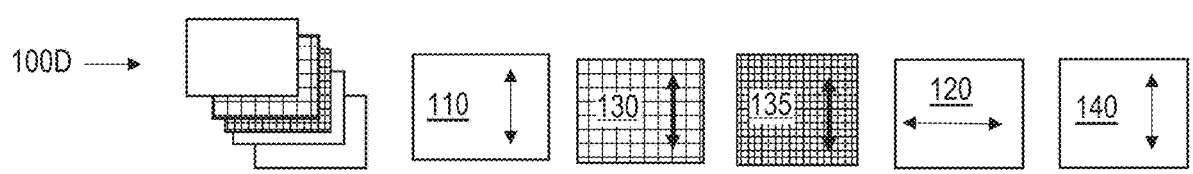
Figure 2:
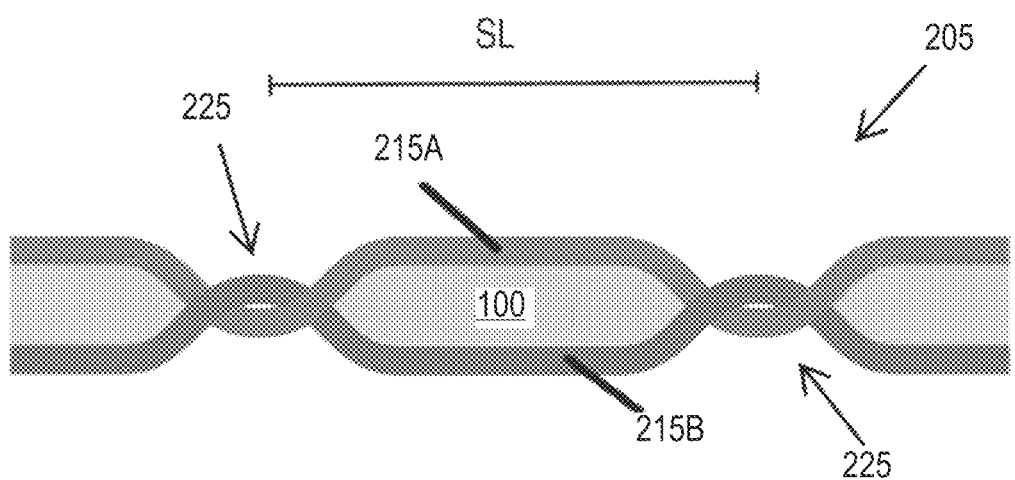
FIG. 2 is a schematic of a stitch structure in accordance with an embodiment of the invention.

The layers (e.g., layer 110 and layer 120 as shown in FIG. 1A, and further layers as shown in FIGS. 1B-1D) of the composite material 100 are connected to each other via stitching that is patterned to guide the stretching of the composite material, such as the expansion pattern of the material 100 and/or the extent of material expansion. In an example embodiment, the stitches are formed via an embroidery process. In embroidery, strands are attached to the composite material 100 in a predetermined pattern. Referring to FIG. 2, a strand 205 includes a first thread 215A (also called a top or needle thread) and a second thread 215B (also called a bottom or bobbin thread). The threads 215A, 215B are generally vertically aligned. In addition, the threads 215A, 215B are interlocked at spaced locations along the length of the strand. Specifically, the top thread 215A is secured to the bobbin thread 215B (and vice versa) via a stitch 225 (i.e., an interlocking structure that locks the strands together). By way of example, a lockstitch (where the one strand wraps the other strand) is utilized. A lockstitch effectively secures the strands to each other, preventing unraveling of crossing yarn 205. While a particular lockstitch is illustrated (an over-lock stitch), it should be understood that different means of interlocking may be utilized to provide desired load extension characteristics to the textile structure. For example, other stitches such as a tatami stitch, a triaxial fill stitch, satin stitch, running stitch, chain stitch, etc. may be utilized.

With this configuration, the top thread 215A is positioned on a first exposed side of the composite material 100 (the first layer 110), and the second thread 215B is positioned on a second exposed side of the composite material (e.g., the base layer 120 in the package of FIG. 1A) such that the top thread is generally aligned with the bobbin thread along the length of the strand. Specifically, the top thread 215A travels along the exposed (outer/upper) surface of the first layer 110 (or other topmost layer), while the bobbin thread 215B travels along the exposed (inner/lower) surface of the second layer 120 (or other bottommost layer, such as a lining layer 140 as described herein and depicted in FIGS. 1B-1D). At predetermined intervals, the strands 215A, 215B pass through the layers of the composite material 100, interlock to form the stitch 225, and then travel back to their respective sides of the composite material. The process is then repeated, with a resulting strand 205 that includes thread segments 215A, 215B generally aligned on opposite sides of the composite material 100 (i.e., the top surface pattern is in registry with the bottom surface pattern).

The distance between immediately adjacent stitches 225 along the length of the strand 205 is referred to as the stitch length SL. The stitch length SL may be any distance suitable for providing sufficient strength for the patterned stitch network as described herein. For example, the stitch length may range from about 1 mm to about 8 mm and is preferably less than about 5 mm (e.g., about 2 mm to about 2.5 mm). Stitch lengths greater than 8 mm are generally insufficient to secure the layers together, as well as provide the necessary lockout of the composite material 100 under load.

The strand 205 (i.e., the threads 215A, 215B) may be similar to those described above for the strands forming the base layer 120, and may include single fiber, filament, or monofilament, as well as an assemblage of textile fibers having a high ratio of length to diameter and normally used as a unit (e.g. includes slivers, roving, single yarns, plies yarns, cords, braids, ropes, etc.).

In an embodiment, the top thread 215A and the bobbin thread 215B can be formed of the materials selected to achieve a desired strength for the patterned strand network (e.g., each strand may be formed of nylon, polyester, polyacrylic, polypropylene, polyethylene, metal, silk, cellulosic fibers (e.g., cotton), elastomers, etc.). The choice of a particular type of thread can depend upon a number of factors, including thread strength. For example, a thread formed of ultra-high molecular weight (UHMW) polyethylene can be stronger than a thread formed of nylon, which in turn can be stronger than a thread formed of polyester. In an example embodiment, the threads 215A, 215B comprise nylon. In another example embodiment, the threads 215A, 215B comprise a polyethylene material, e.g., ultra-high molecular weight polyethylene (UHMWPE). In further embodiments, the strands may be high tenacity nylon (e.g., nylon 6,6) or a polyethylene terephthalate ("PET"). The threads can have a suitable elongation value ranging, e.g., from about 20% to about 30%.

The dimensions (size/shape) of the threads 215A, 215B may be any suitable for its described purpose. For example, the top thread 215A and the bobbin thread 215B can range from M40 (70 TEX) to M80 (35 TEX). The top thread 215A and the bobbin thread 215B can be identical in size and composition. Preferably, the top thread 21A and the bobbin thread 215B differ in size and/or composition. For example, the bobbin thread 215B possesses a higher TEX value and/or is formed of different material than the top thread 215A. In an embodiment, the top thread 215A is a M60 (45 TEX), continuous filament nylon 6,6, while the bobbin thread 215B is and M122, continuous filament nylon (NYLBOND and ECOBOBS, respectively, each available from Coats Industrial (Great Britain)).

Figure 5:
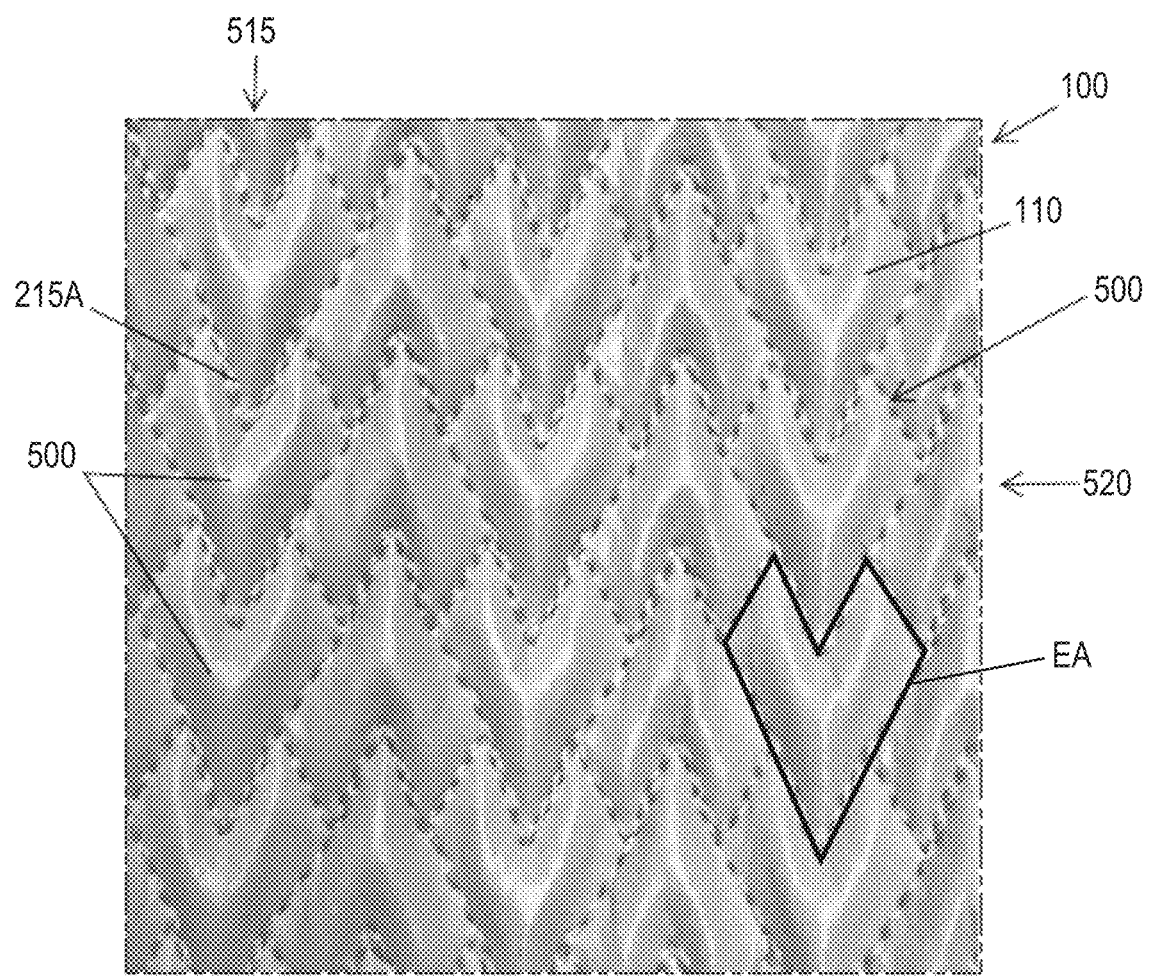
FIG. 5 is a top view of composite material in accordance with an embodiment of the invention.

The embroidery process is utilized to form a patterned stitch or strand network within the composite material 100. The embroidery may be conducted utilizing an embroidery machine available from Shanghai Tajima Embroidery Machinery Co., Ltd. The stitch network is structural, being capable of controlling the expansion pattern of the composite material 100. Thus, while it permits expansion, it not only directs the movement of the expansion, as well as can limit the degree of expansion. Referring to FIG. 5 (showing the first layer 110 of composite material 100), the stitch network 500 defines a plurality of discrete cells 510, each cell having predetermined dimensions (size and shape) and being formed by an enclosed area EA, which, in turn, is defined by a stitch perimeter or border of stitching lines/stitching rows (i.e., a pattern of straight and/or curved lines or rows formed from a plurality of stitches) for the cell. In the embodiment of FIG. 5, the stitch network 500 includes an array of polygonal (e.g., arrow-shaped) cells 510 defined within the perimeter or boundary of stitch lines or stitch rows. The cells 510 have uniform size and shape, with the cells 510 further being organized in columns 515 and rows 520. As shown, the arrowhead cells of one column are inverted compared to the arrowhead cells of an adjacent column. In further embodiments, the cells can have varying sizes and/or varying shapes.

In example embodiments, the stitch network 500 is configured to control the expansion pattern of the composite material 100. In particular, as described herein (with reference to FIGS. 7A-7C), the size(s) and shape(s) of the cells 510 of the stitch network 500 may have shapes that expand and contract in a predetermined pattern, cooperating to allow and guide the expansion or contraction of the composite material 100 (or one or more layers of the composite material) a suitable dimension during stretching/tension of the second layer 120 as well as contraction of the second layer when the tension on the second layer is released. In an embodiment, the shapes and/or configuration of the cells (as defined by the stitching pattern/stitch network applied to the composite material) may be selected to create a pattern effective to lower the Poisson's ratio of the composite material (compared to the ratio the composite material would have without the array of cells).

In a further embodiment, the stitch network 500 that forms the cells 510 may be selected to provide the composite material with a negative Poisson's ratio. In other words, when stretched, the composite material and/or cells of the composite material will move or expand in a direction generally orthogonal or perpendicular to the applied tension or stretching force. This will also cause a change in the shapes of the cells, where the cells collapse along the z-axis in response to such tension or stretching force as described herein (in relation to FIGS. 4B-4D).

Lowering or imparting a negative Poisson's ratio to the composite material 100 can be achieved by providing a stitch network that forms cells having one or more auxetic shapes (e.g., the auxetic arrowhead shapes of cells 510 for stitch network 500). Further still, the auxetic shapes can be formed as reentrant polygonal shapes. A reentrant polygonal shape has one or more reentrant angles, where a reentrant angle is an internal angle of the polygon that is greater than 180°. Reentrant auxetic shapes can have hinge-like features (e.g., at the reentrant angle locations of the auxetic shapes) that can cause an expansion or compression of the composite material or layer upon which the auxetic shape is formed in a direction orthogonal or perpendicular to a direction of corresponding expansion or compression of the composite material. In the embodiments described herein, hinge-like features are formed by the stitch network defining the cells 510, including the strands 215A, 215B and the stitches 225.

Figure 6A:
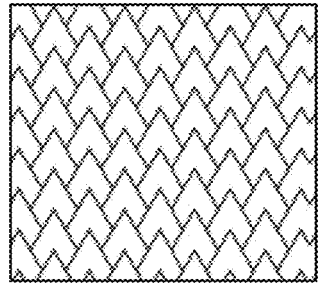
FIGS. 6A, 6B, 6C, 6D and 6E schematic views of stitch patterns according to embodiments of the invention.
Figure 6B:
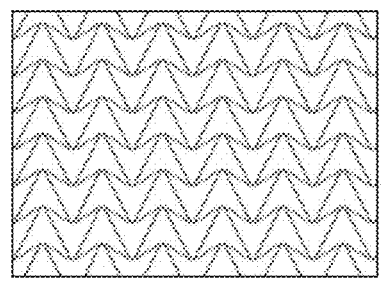
Figure 6C:
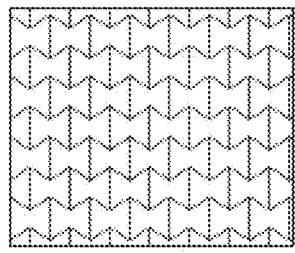
Figure 6D:
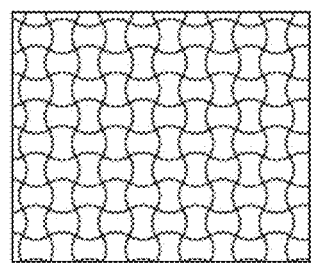
Figure 6E:
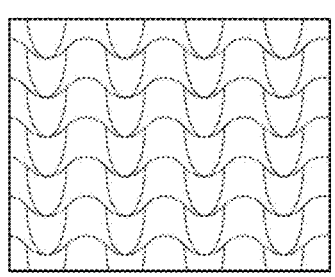

Any suitable type or types of auxetic patterns can be formed by the patterned strand network along the exposed sides of the composite material 100. Some non-limiting examples of cell arrays formed as auxetic patterns which can be used to form cells of a composite material are depicted in FIGS. 6A-6D. Referring to FIGS. 6A and 6B, stitch networks 605, 610 are shown along a composite material forming cells having an arrowhead auxetic shape that is similar in shape and pattern configuration as the stich network 500 of cells 510 depicted in FIG. 5. Other examples of auxetic cell shapes that can be provided for a composite material are shown by the stitch patterns 615, 620, 625 in FIGS. 6C, 6D and 6E (e.g., hour glass shaped auxetic cells for stitch patterns 615, 620, and wavy shaped auxetic cells for stitch pattern 625).

It should be understood, however, that other enclosed cell shapes may be utilized in forming the stitch network. For example, non-auxetic polygonal cells may be utilized.

An example method of forming the composite material 100 is now described with reference to the flow diagram of FIG. 3 and the schematic cross-sectional views of FIGS. 4A, 4B and 4C. In operation, first layer 110 and second layer 120 are obtained. At Step 310, the resilient second layer 120 (also called the base layer) is placed under tension and stretched to a suitable elongation value (e.g., stretched along at least one axis to an elongation value of at least 150%). At step 320, the first layer 110, which is not tensioned, is then positioned over the tensioned second layer 120, as depicted in FIG. 4A. At step 330, the layers 110, 120 are then connected, e.g., via embroidery as described herein, with stitch sites 425 (i.e., locations at where stitches 225 are to be formed) being defined along the surface areas of layers 110, 120. See FIG. 4B. As noted above, embroidery of the stitches 225 creates the stitch network 500 along the composite material 100 so as to define a pattern of stitched cells 510 along the composite material. After formation of the stitch network 500, at step 340, the tension on the second layer 120 is released, allowing the resilient layer to recover, returning to its normal, unstretched state. See FIG. 4C. Once the composite material is in its normal, unstretched state, it may be incorporated into an article of apparel (step 350) in a manner similar to other textile structures.

Figure 4A:
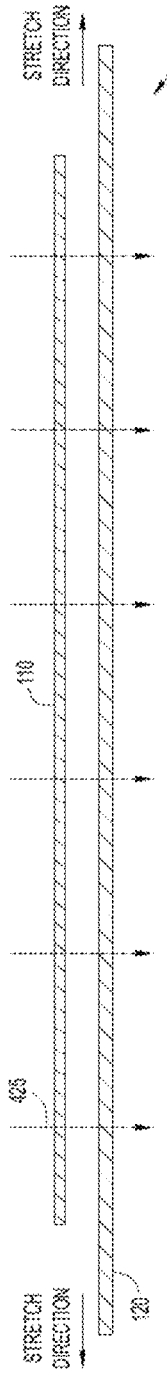
FIG. 4A is a cross-sectional, exploded view of a plurality of layers that form a composite material as depicted in FIG. 1A and in which one layer (the second layer) is stretched/in tension, and further showing sites designating threaded stitch locations to secure the material layers together.
Figure 4B:
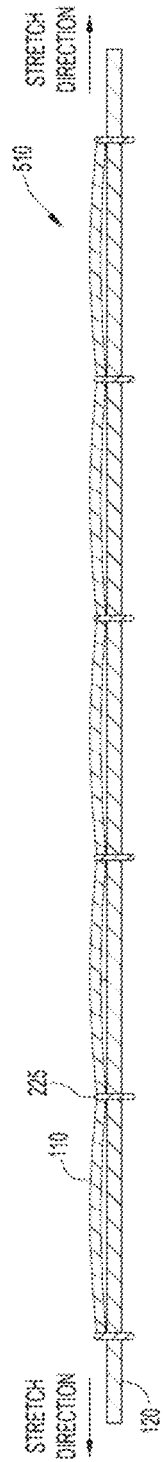
FIG. 4B is a cross-sectional view of the composite material shown in FIG. 4A after threaded stitches have secured the material layers together and the one layer.
Figure 4C:
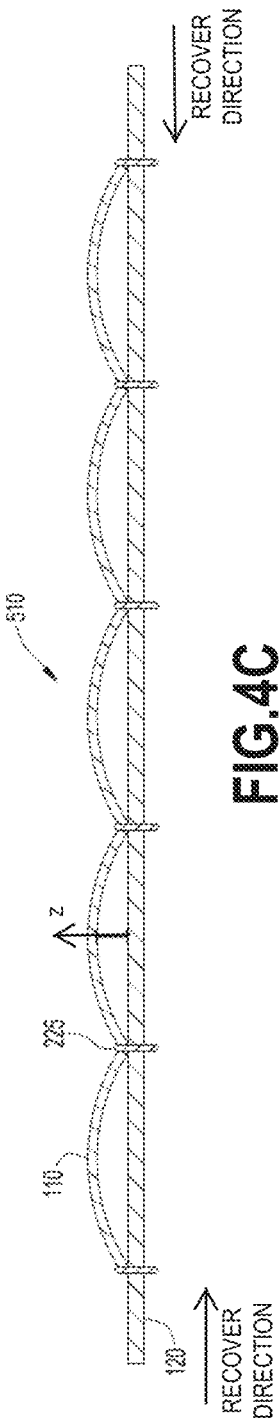
FIG. 4C is a cross-sectional view of the composite material shown in FIG. 4B and in which the tension on the composite has been released.

As depicted in FIG. 4C, release of the tension allows the second layer 120 to recover substantially or entirely, contracting along the x and/or y axes to an original, normal or unstretched position. The first layer 110, being non-stretch or a lower stretch (i.e., having a lower elongation value) along the axis on which tension to the second layer was applied, causes one or more of the cells 510 of the stitch network 500 to buckle or pucker, moving away (along a Z dimension or axis from the surface area (which defines a generally two dimensional surface area in X and Y dimensions or axes) of the second layer 120 as the second layer contracts to its relaxed/original state. In particular, in the relaxed state of the second layer 120, the first layer 110 forms a buckled or undulating surface pattern in the Z dimension way from the underlying second layer 120, where the pattern of stitches 225 formed in the composite material 100 secure the first layer 110 to the second layer along the stitch network 500. Thus, the cells 510 formed by the process of steps 310-350 protrude from the surface of the underlying second layer 120 when the second layer is in a relaxed (unstretched) state. Accordingly, voids 470 (e.g., air spaces) are defined within pockets of the buckled cells 510 (i.e., the spacing or volume between the buckling first layer 110 and the relatively flat or unbuckled second layer 120 within each cell 510).

Thus, the composite material includes a series of protruding pockets formed by the first layer 110 being separated from the second layer 120 within each cell 510. The overall pattern of the pockets, moreover, is defined by the stitch pattern or network 500. Referring again to FIG. 5, the resulting composite fabric material 100 (in its unstretched state) includes an uneven surface, where layer 110 forming each cell 510 is buckled or puckered, extending away from the second layer 120 along the z axis or direction orthogonal to the surface of the second layer (see FIG. 4B). Each cell 510 is defined and bordered by stitching (shown via top thread 215A). The area within the border protrudes outward, thereby separating the first layer 110 from the second layer 120 within the border. With this configuration, a composite material 100 including an array of cells 510 is formed. The shape of the protruding cells or pockets, moreover, matches the shape of the original stitch network cells.

With this configuration, a composite material 100 provides a dynamic textile that that repeatedly stretches under load and recovers upon removal of the load. In particular, the stretch properties of the second layer 120 allow for a certain amount of overall stretch for the composite material under load and, upon removal of the load, further drives the entire composite back to its normal, unstretched state. As depicted in FIGS. 7A, 7B and 7C, the composite material 100 begins in its normal, unstretched configuration. FIG. 7A. Here, the distance ($d_{max}$) between the base layer and the highest point of the protruding cell is at its maximum value. Similarly, the void volume of the void 470 is at its maximum.

Applying a tension or load (e.g., along the dominant stretch direction of the base layer 120 (the x-axis)) to the composite material 100 causes stretching of the second layer 120 in the directions indicated by the arrows. FIG. 7B. This results in a corresponding splaying or collapse of the first layer cells 110 in the Z direction (indicated by arrow z) toward the second layer 120. As the cells 510 collapse or flatten the distance $d_{int}$ between the highest point of the cell 510 (as defined by outer layer) decreases, as does the void volume of the cell voids 470. Continued application of tension or load stretches of the composite material results in further until full or complete collapse and flattening of the cells 510 results, as seen in FIG. 7C. At this degree of tension, the distance $d_{min}$ is at a minimum, with the outer layer 110 generally contacting (e.g., nearly contacting or continuously contacting) the base layer 120; accordingly, the void volume of each cell void 470 at its minimal level and the composite material significantly flattens.

This collapse or flattening of the cells 510 during stretching of the second layer 120 enhances stretching of the composite material during cell collapse until the cells lock down or lock out (e.g., completely flatten) so as to prevent further expansion of the composite material in the area of the flattened cells. This becomes a lock down or a lock out position or static state at which the composite fabric is prevented from further movement.

As shown, at an original or initial relaxed condition of the composite material (FIG. 7A), the cells 510 are buckled to their full extent in the "Z" direction (i.e., greatest separation between first layer 110 and second layer 120 for each cell 510) and are in a dynamic state. As the composite material 100 is stretched at any location in the indicated direction, the elongation of the base layer 120 causes the cells 510 to flatten by collapsing driving the pliable layer 110 toward the base layer, thereby reducing the volume of the voids 470 within the cells 510 (as shown, e.g., in FIGS. 7B and 7C). Similarly, any layers 140 positioned on the opposite side of the base layer similarly begin buckled and then flatten as load is applied on the composite fabric (e.g., in the direction of the dominant stretch axis of the base layer 120) as seen best in FIG. 13.

Upon release of the tension on the composite material 100, the composite material contracts back to its relaxed (e.g., original) dimension and the cells 510 buckle outward and away from the second layer 120 to their original positions as depicted in FIG. 7A. The cells 510 therefore exhibit a dynamic or loaded state in which the cells are capable of movement along the z-axis (e.g., as shown in FIGS. 7A and 7B) and a degree of stretching movement of the composite material, and the cells 510 further exhibit a static state (FIG. 7C) when the cells are fully flattened or collapsed toward the second layer 120 so as to lock the portion of the composite material 100 including the fully flattened cells in place and prevent further stretching movement of this portion of the composite material.

Due to the stitching process (e.g., embroidery), the patterned strand network is identical and precisely aligned on each of the exposed sides of the composite material 100. Due to its formation, each cell 510 is further capable of flattening or splaying when subjected to a load force, where each cell can completely flatten independent of other cells due to each cell being independently locked in position in relation to the second layer 120 due to the stitching that surrounds the cell. Thus, depending upon a localized tension applied to a first portion of the composite material 100, an area defined by the first portion can exhibit varying degrees of movement and stretch, with corresponding flattening (e.g., to lockdown) of cells when the tension is applied to the first portion while a second portion of the composite material that is not subjected to the localized tension does not exhibit stretching or collapsing action of the cells within the area defined by the second portion.

The collapse of cells 510 and stretching of the composite material to lock out can be further enhanced by orienting the auxetic shapes of cells in relation to a dimension of stretch of the second layer 120 during formation of the composite material. In an example embodiment, a stitched network 500 of cells 510 having auxetic polygonal shapes with reentrant angles (e.g., arrowhead auxetic shapes, hourglass auxetic shapes, etc.) is formed (step 330) along the layers 110, 120 such that at least one reentrant angle of the auxetic shapes is oriented in a direction that is transverse (e.g., orthogonal) in relation to the dimension of dominant stretch of the tensioned second layer. Such an orientation of auxetic shapes for the cells in relation to the greatest elongation potential for the second layer in the composite material can facilitate a suitable degree of stretch of at least a portion of the composite material and sufficient cell movement until cell lockout is achieved (i.e., full flattening or full collapse of the cells).

Figure 8:
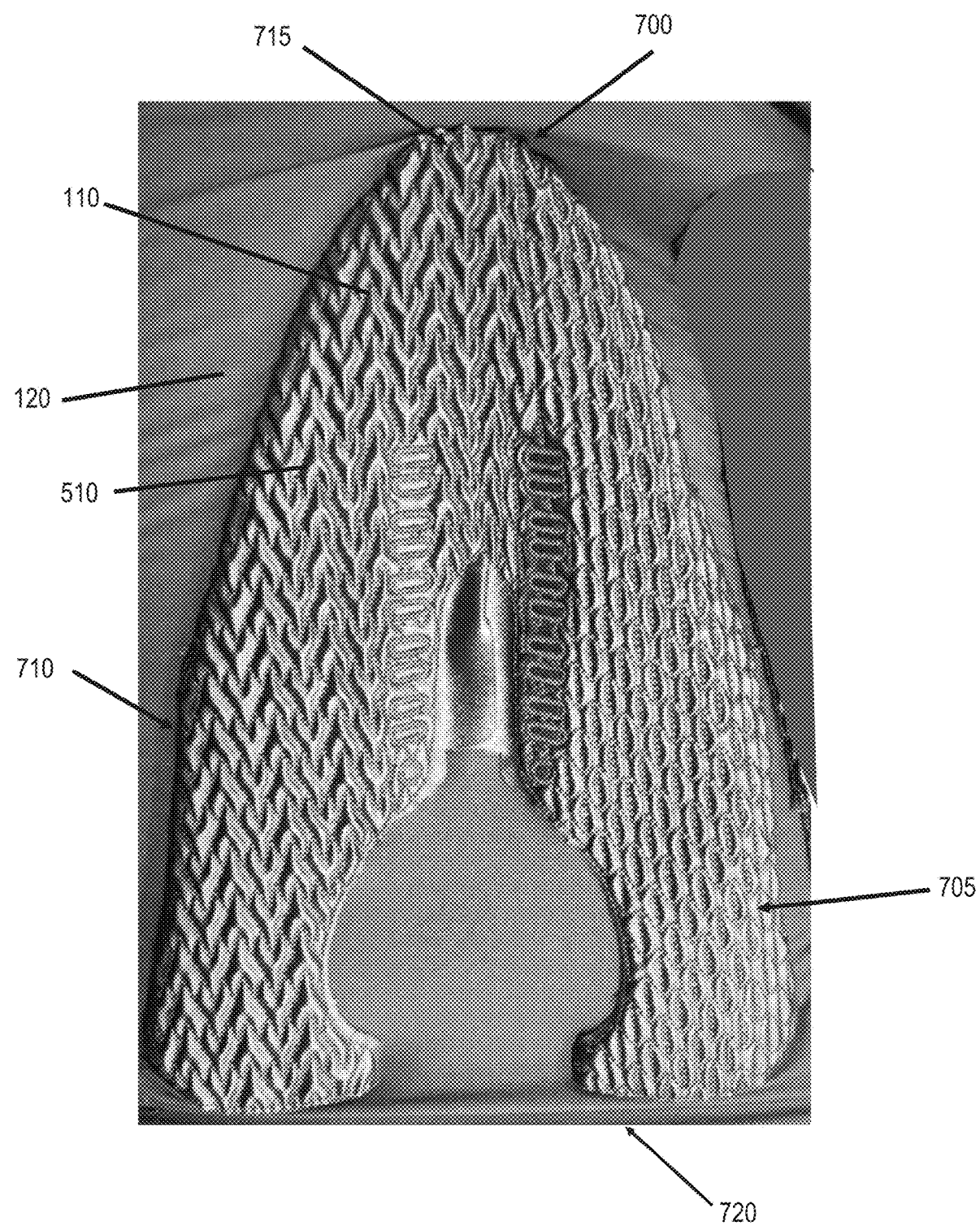
FIG. 8 is a top view of material structure that forms an upper of an article of footwear and which includes a composite material formed in accordance with an embodiment of the present invention.

An example embodiment for implementing the composite material 100 within an upper of an article of footwear (i.e., a shoe) is now described with reference to FIGS. 8 and 9. Referring to FIG. 8, an upper for a shoe can be formed with a upper material 700 that includes at least layers 110 and 120, where layer 110 forms an outer surface of the upper. The process flow chart described herein and depicted in FIG. 3 can be used to form the upper material 700, where first (outer) layer 110 is first cut as a blank to form the shape of the upper when secured with the second layer 120. In particular, the first layer 110 includes a first (e.g., lateral) side 705 that will form the lateral side of the shoe upper and a second (e.g., medial) side 710 that will form the medial side of the upper, a front or toe end 715 and a rear or heel end 720 that will respectively form the toe and heel ends of the upper when combined with a sole structure to form a shoe (e.g., as depicted in FIGS. 8A, 8B and 8C). A cut-out portion of the heel end 720 will define the neck opening for the upper when the composite material 700 is combined with a sole structure. After completing process steps 310-350, the composite material 700 can be cut out along the perimeter/edges of first layer 110 (thus removing excess portions of layer 120) to form the upper material that will combine with a sole structure to form a shoe.

In certain embodiments (e.g., depending upon the material cost of the first layer), it may be desirable to obtain precise dimensions for the first layer 110 prior to securing to the second layer so as to ensure the first layer is sufficiently sized to fit the final dimensions of the upper. In this case, a material that forms the first layer can be pulled over a shoe last or other structural form to expand slightly under tension and simulate the final dimensions required for the upper, where the first layer 110 is then cut to the precise dimensions while the material remains pulled over the shoe last (thus defining the shape of first layer 110 in FIG. 8).

When the composite material 100, 700 is utilized in forming the upper of a shoe (FIG. 9A), the composite material adapts to the dimensions (shape and/or size) of the user's foot. This adaption occurs not only while the user dons or doffs the shoe, but also during active use of the shoe (e.g., during sports or other physical activities), permitting selective expansion of the upper (the composite material 100, 700) based on load conditions. Under load, the cells 510 splay out or expand until they flatten, at which point the cell locks out, preventing further expansion of the fabric in that area.

Further, when the shapes of the cells 510 are aligned in a particular direction of the upper/shoe in relation to the dominant stretch direction of the second layer 120 (i.e., direction or dimension of the second layer having the greatest or maximum elongation value), further enhancement can be achieved with regard to the expansion and lockout features of the upper imparted by the dynamic movement (flattening/collapsing) of the cells during use of the shoe. For example, the composite material 100, 700 can be integrated as part of the upper so as to align or orient the second layer 120 such that the dominant stretch dimension for the second layer is aligned in a direction transverse the length or toe-to-heel dimension of the upper and shoe (i.e., in a direction extending the width or medial-to-lateral side dimension of the upper and shoe). In such embodiments, the composite material 100, 700 can also be integrated as part of the upper such that one or more reentrant angles for auxetic shapes of the cells 510 of the composite material are aligned in the length (toe-to-heel) dimension of the upper and shoe.

In further embodiments, the composite material 100, 700 for the upper may include additional layers depending on the desired end use. Example embodiments of further composite materials are depicted in FIGS. 1B, 1C and 1D. As shown, the composite materials 100A, 100B, 100C, 100D are similar to composite material 100 of FIG. 1A in that each comprises the pliable, first or outer layer 110 and the second or resilient, stretch layer 120. As noted above, the first or outer layer 110 may be formed of any material suitable for its described purpose. For example, the first layer may be knit fabric, a woven fabric, a film or a nonwoven web. The first layer 110 also has a suitable thickness to facilitate bending or buckling as well as stretch/lockout features for the cells 510 in the manner described herein. By way of example, the first layer 110 can have a thickness no greater than about 2 mm (e.g., a thickness of no greater than 1 mm, or less than 1 mm). In an example embodiment, the pliable first layer 110 can comprise a synthetic leather material having a thickness of about 0.5 mm to about 1.5 mm, such as 0.8 mm. The other layers described herein for the different embodiments of the composite materials (layers 120, 130, 135, 140) can have thickness in a similar range (about 0.5 mm to about 2.0 mm). Each layer can further have a suitable basis weight that renders the layer, when combined with one or more other layers to form the composite material, suitable for achieving the features of the stitched network of cells for the composite material. For example, the basis weight for one or more layers can be in the range from about 80 $g/m^2$ to about 150 $g/m^2$ or greater.

As previously noted, the resilient second layer 120 may be a four way stretch fabric. A dominant degree of stretch or elongation (elongation value) of the second layer 120 in one dimension is at least about 50%, and the second layer 120 can be oriented within the composite material 100 such that its dominant degree of elongation is in the second (width) direction of the composite material 100. The resilient second layer 120 can be a fabric formed from at least about 50% elastic strands. In an embodiment, the second layer 120 is a knit layer that includes at least about 50% elastane strands, e.g., at least about 60% elastane strands (e.g., about 68% elastane strands). A fabric with 60+% elastane strands possesses high stretch or elongation properties, such as a maximum elongation of at least 50%. This fabric also exhibits high recovery properties (i.e., ability to recover or contract a length that is some percentage of original length/width after stretch or tension is removed from the fabric), e.g., recovery in both the first and second directions of greater than about 50%, or even about 90% or greater. Thus, the second layer 120 has a greater degree of elongation in at least the width direction (and, e.g., in the width and length directions) in relation to the first layer 110.

In addition, the composite material can include one or more further layers, including one or more intermediate layers that are between the first layer 110 and the second layer 120 and/or one or more inner or outer layers that are not between but instead located to one side of the first layer 110 or the second layer 120. In the example embodiment of FIGS. 1B and 1C, the composite material 100B, 100C includes an intermediate reinforcement layer 130 disposed between the first layer 110 and the second layer 120 (e.g., along an outer facing side of the second layer 120). In addition, an inner or lining layer 140 may be disposed adjacent the second layer 120 (on an opposing side of the second layer). The composite material 100C may further include a second reinforcement layer 130 oriented between the second layer 120 and the first layer 110. Alternatively, the composite material 100D may include a spacer reinforcement layer 135 oriented between the second layer 120 and the reinforcement layer 130 as shown in FIG. 1D.

In general, the layers (other than the first layer 110 and the second layer 120) can be selected so that, while flexible, they are generally non-stretch and/or non-recovery textiles. By way of example, the layers may be fabrics having a maximum elongation or stretch of less than 30% and preferably less than 10%. Stated another way, while the textile may include small amounts of mechanical stretch, the textile includes no elastic stretch. By way of specific example, the reinforcement layer 130 may be a rigid tricot knit fabric formed of 100% hard/inelastic yarn such as nylon. The spacer fabric 135 (which can provide airflow and/or cushioning to the structure) is similarly a low or no stretch material formed completely of a hard yarn such as polyester. Finally, the lining layer 140 is a knit layer formed entirely of hard yarns such as polyester.

In each composite material package illustrated in FIGS. 1B-1D, the second layer 120 possesses a dominant stretch or elongation value that is oriented orthogonal to the dominant stretch dimension of the reinforcement layer 130, the spacer layer 135, the lining layer 140, and the first layer 110, as indicated by the arrows (i.e., the arrow is aligned in a horizontal or second direction for layer 120, and the arrows are aligned in a vertical or first direction for layers 110, 130, 135, 140). In addition, to the extent any of layers 110, 130, 135, 140 has some degree of elongation in the horizontal (second) direction (i.e., the same direction as the dominant stretch direction for the second layer 120), the elongation values for these layers in the horizontal direction is significantly less than the elongation value for the second layer 120 in its dominant stretch dimension.

In still further embodiments, the various layers as depicted in the embodiments of FIGS. 1A-1D can be oriented in relation to each other based upon the warp or weft direction of each textile layer. A warp direction for a textile refers to the orientation of threads or yarns that run the length of a continuous roll of fabric, where the warp direction also refers to the machine direction of the formed textile. The weft direction of the textile is transverse to the warp or machine direction (i.e., the cross direction of the textile). When the composite materials 100, 100B, 100C, 100D depicted in FIGS. 1A-1D are used to form an upper for a shoe using the methods as described herein, the machine direction corresponds with the length (toe-to-heel) dimension of the shoe. The first layer 110 and the second layer 120 can each be oriented in the warp (toe-to-heel) direction, the reinforcement layer 130 and the spacer layer 135 can be oriented in the weft (lateral to medial side) direction, and the lining layer 140 can be oriented in the warp (toe-to-heel) direction. In such embodiments, the second layer 120 preferably has a dominant stretch or elongation value (e.g., an elongation value of greater than 50%, or even greater than 100%, and as great as 160%) that is in the weft direction of the second layer.

As with the composite material 100 described for FIG. 1A, an embroidery process can be used to connect some or all of the layers together as depicted in FIGS. 1B-1D, as well as form the patterned stitch network. In other words, when forming the composite materials 100A, 100B, 100C, the second or stretch layer 120 is placed under tension while the remaining layers 110, 130, 135, 140 are not. The layers can be stitched together via stitches 225 (e.g., via embroidery) and, after formation of the patterned strand network, the tension on the second layer 120 can be released according to the process steps as described herein with reference to the flowchart of FIG. 3. This release in tension on the second layer 120 allows the second layer 120 to relax and recover/contract back to (or close to) its original dimension along the first direction of the composite material 100A, 100B, 100C. Since the first layer 110 and any other further layers have been secured (via stitches 225) to the second layer 120 while the second layer 120 was stretched, the contraction of the second layer 120 results in a bending, bowing or buckling outward (i.e., in a "Z" dimension of the composite material) of these layer(s) in relation to the second layer 120 and further at the areas between enclosed shapes defined by the stitching patterns.

Similar to the cells 510 of the composite material 100, the buckling forms pockets or cells along the exposed sides of the composite materials 100A, 100B, 100C where the cells are defined by at least the first layer 110 and/or any other layers 130, 135, 140 bowing outward or buckling on either side of the second layer 120 within the areas defined between the stitched shapes. The second layer 120 remains relatively flat or unbuckled. Voids (e.g., air spaces) 470 are also defined within the pockets of the buckled cells (i.e., the spacing or volume between the buckling layers and the relatively flat or unbuckled second layer 120). Furthermore, each cell is capable of flattening or splaying when subjected to a load force, where each cell can completely flatten independent of other cells due to each cell being independently locked in position in relation to the second layer 120 due to the stitching that surrounds the cell.

Figure 3:
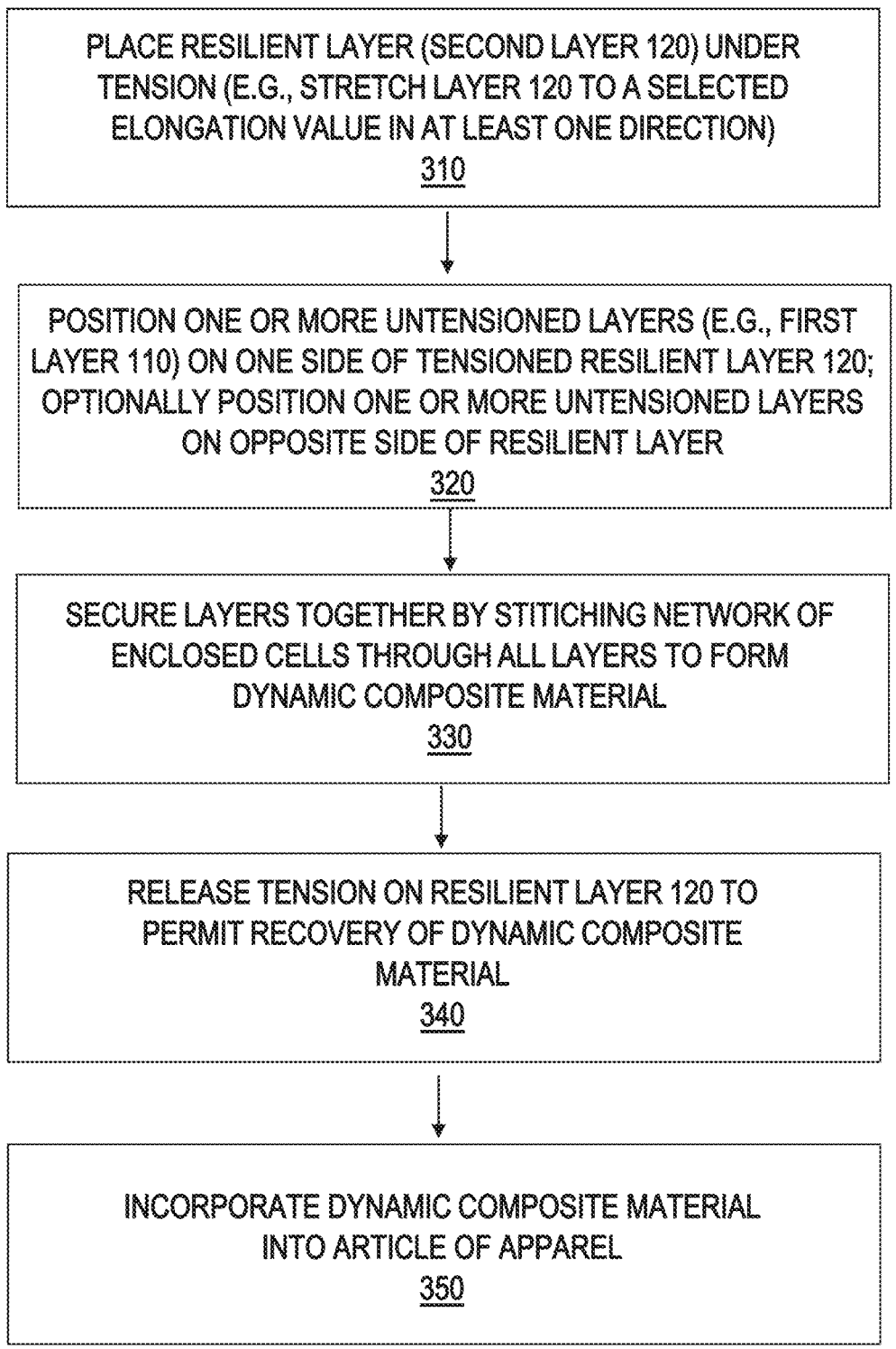
FIG. 3 is a flowchart depicting an example embodiment of the process for forming a patterned strand network for the composite material as described herein.

In some embodiments, it may be desirable to add a further layer to the composite material after performing the process steps of FIG. 3. For example, in an embodiment in which it is desirable to add a lining layer 140 to an underside of the second layer 120, where the lining layer forms an interior surface of the composite material (e.g., for a shoe upper) and may be in contact with the wearer. As seen best in FIG. 13, when the composite material 100B is in its normal, unloaded state, the cells 510 of the lining layer 140 protrude from the surface of the base layer 120, creating a void or pocket 470. Under load, moreover, the cells 510 of the lining layer collapse until lockout (e.g., full, continuous contact with the base layer 120).

The different embodiments of component materials 100, 100B, 100C, 100D depicted in FIGS. 1A-1D can be utilized to obtain different performance characteristics for an intended purpose or specific application (e.g., based upon a particular sport, such as football, soccer, baseball, etc.). For example, providing one or more reinforcement layers 130 and/or a reinforcement layer 130 and a spacer layer 135 to the component material including the first and second layers 110, 120 can enhance the puncture resistance of the component material (e.g., when integrated within a shoe upper) and/or increase the tear strength or other properties of the material.

In a further embodiment, a laminate film can be adhered (e.g., via a heat press method) to the outer surface of layer 110 so as to provide a thin synthetic "skin" film over the upper outer surface. The laminate film is very thin and can have a thickness that is less than the thickness of layer 110

(e.g., about 0.2 mm to about 0.3 mm) so as to still permit dynamic movement of the cells 510 during physical activities when the shoe is worn. The synthetic "skin" film can provide a protection layer over the upper (e.g., to provide moisture barrier or resistance properties, enhanced puncture resistance, etc. for the upper).

Figure 9A:
FIGS. 9A, 9B, and 9C illustrate views of an article of footwear including a composite material formed in accordance with an embodiment of the present invention.
Figure 9B:
Figure 9C:
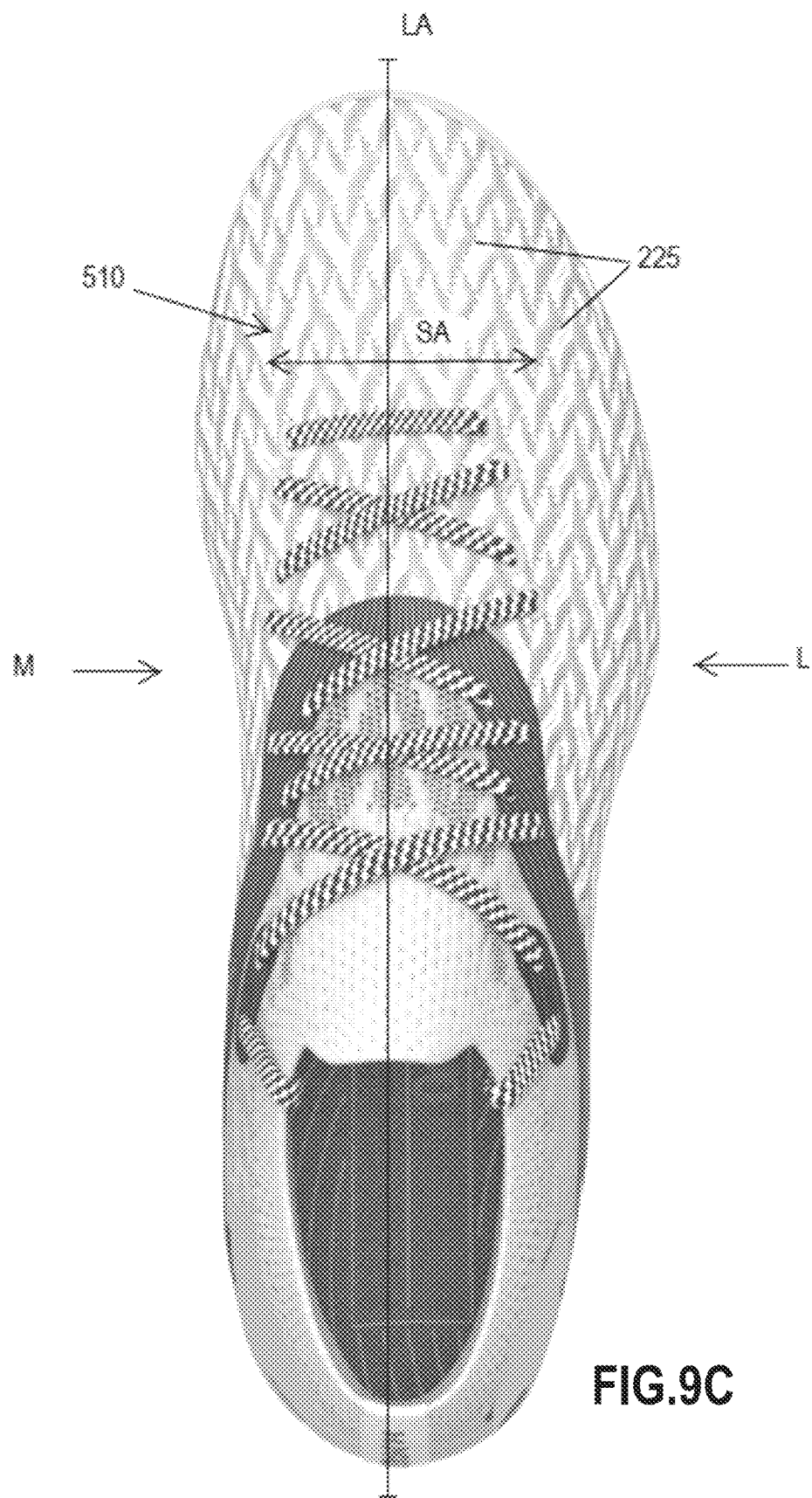

Referring to FIGS. 9A, 9B and 9C, an article of footwear or shoe 800 is depicted including an upper with the composite material 700 integrated as some or all of the upper (where material can comprise composite material 100 or any of the other composite materials 100B, 100C, 100D as described herein). The shoe 800 defines a longitudinal shoe axis LA dividing the shoe into lateral L and medial M sides. The shoe 800 includes an upper 805 and a sole structure 810 spanning heel 815A, midfoot 815B, and forefoot 815C sections of the shoe. The shoe 800 can be in the form of a running shoe or other type of athletic shoe. The sole structure 810 of the shoe 800 can include a midsole and an outsole that are separately formed of any one or more suitable materials and can include any suitable number (one or more) of layers for a particular application of use for the shoe. The medial side M is oriented along the medial or big toe side of the user's foot and the lateral side L is oriented along the lateral or little toe side of the user's foot (the medial and lateral sides being distinguished by a central, longitudinal axis LA). The forefoot section 815C includes the toe (i.e., front) end (also referred to as a toe cage or toe box) that corresponds with the toe end of the user's foot, and a heel (i.e., rear) end that corresponds with the heel of the foot. The upper 805 defines a cavity between the medial and lateral sides and the toe and heel ends such that, when secured to a portion of the sole structure 810, the upper receives, covers and protects the foot within the cavity. The upper 805 further includes an instep positioned between the lateral side and the medial side, where the instep extends over the instep of the foot and can a tongue (where a fastener, such as a shoe lace, can be disposed at the instep to cinch or secure the lateral and medial sides as well as other portions of the upper together to tighten around a user's foot when placed within the cavity of the upper).

The composite material 100 (which includes a plurality of material layers and is formed in a manner as described herein) can be integrated at any one or more locations along the upper at the lateral and/or medial side, at the instep, at the toe end and/or at the heel end. The composite material 100 can be integrated into the upper 805 at any one or more suitable locations. In example embodiments, the composite material 100, 700 can be used to form a substantial portion of the upper, with cells 510 that cover a substantial portion (e.g., some or all) of the lateral, medial, front and heel sides as well as the instep portion of the upper. It is understood that the lateral side 705, medial side 710, toe end 715 and heel end 720 of the composite material 700, when used to form the upper 805, respectively correspond with the lateral side L, medial side M, toe end at the forefoot section 815C, and heel end at the 815A of the upper and shoe.

In the example embodiment depicted in FIGS. 9A-9C, a shoe with an upper is depicted in which a significant portion of the upper is formed with a composite material 100 that provides cells 510 having auxetic shapes along the upper. Any suitable laminate film and/or printed material (e.g., printed design patterns) can also be provided along selected portions of the exterior surface of the composite material. For example, printed design patterns (or laminate film portions) can be provided at locations within cells 510 along the upper. The additional material provided along the exterior surface of the upper and within the cells can provide a pleasing aesthetic effect for the upper (e.g., by providing elaborate or other designs within cell locations). The additional material can provide a further functional effect for the upper for a particular application (e.g., to provide waterproofing, shielding protection for the foot of the wearer, abrasion resistance and/or further strengthening to portions of the upper at certain cell locations). As previously noted herein, a very thin laminate film can be provided to form a synthetic "skin" layer over the outer surface of the upper (e.g., to provide a protective outer layer or covering for the upper).

The composite material 100 can be implemented/integrated with the upper such that the expansion or stretch axis SA or direction of the composite material (i.e., the dimension of dominant stretch for the second layer 120) is oriented transversely across the upper (transverse to the longitudinal axis LA, or from the lateral side L to the medial side M of the shoe). Accordingly, tension applied along the cell array in the transverse direction (along stretch axis SA) will cause the cells to splay/flatten as conditions warrant. Tension or load applied along the longitudinal axis LA, however, will have little to no effect on the expansion of the composite material. Further, the shapes of the cells 510 can be oriented such that at least some (e.g., most) of the stitch lines of the stitch network 500 are oriented in the direction of the longitudinal axis LA (i.e., in the toe-to-heel direction) of the upper. Further, cells 510 having auxetic shapes can be oriented such that reentrant angles of the auxetic shapes are aligned in the same direction as the longitudinal axis LA (i.e., a toe-to-heel dimension of the shoe) and thus transverse the stretch axis SA of the composite material.

Utilizing the composite material 100 to form some portion of the upper provides features to the upper including durability and an improved fit over the user's foot, because the stretch of the upper can be adapted to the individual user's foot. In particular, each cell 510 of the composite material 100 stretches and/or collapses only as far as is needed for the given area of the foot. This expansion characteristic imparted to the upper by the composite material applies not only when the user puts on the shoe, but also as he or she moves along a surface. The composite material 100 is further dynamic, adjusting to load conditions as the user moves, but where the cells 510 never collapse beyond their lockout dimensions (i.e., the dimensions of the patterned stitching surrounding each cell). In particular, when the cells 510 are in a dynamic state, the cells are capable of collapsing when the composite material is stretched and the cells are further capable of buckling or expanding in the "Z" direction from the second layer 120 when the stretch or tension on the composite material 100 is released. The cells are further in a static state when the cells collapse to a lockout position (e.g., as depicted in FIG. 7C) in which further expansion of the composite material is limited.

The above described embodiments of the composite material can also be used with or implemented in other types of articles of apparel. For example, the composite material 100 can be implemented for use in a brassiere, a shirt, pants, or other types of clothing.

Figure 10A:
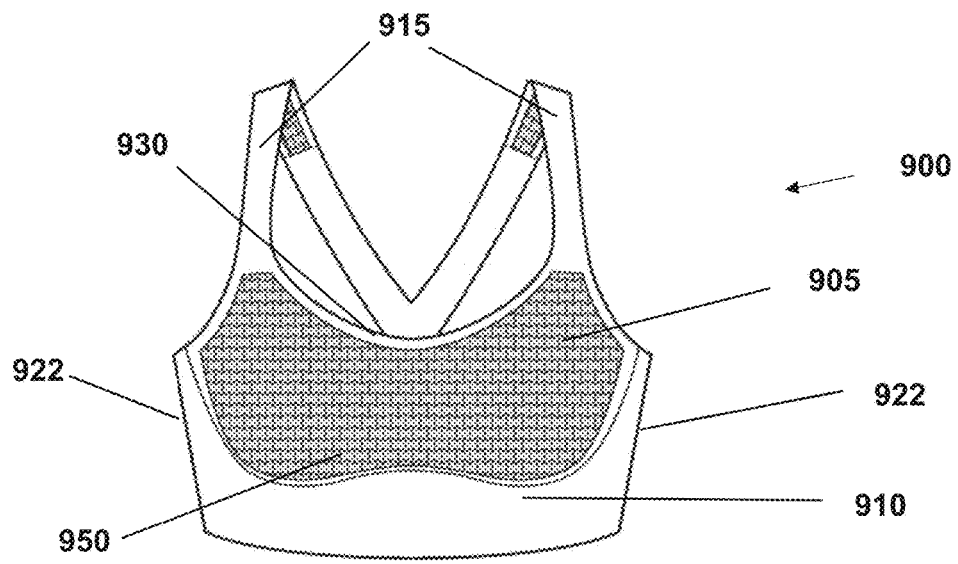
FIG. 10A is a front view of a brassiere including a composite material formed in accordance with an embodiment of the present invention.
Figure 10B:
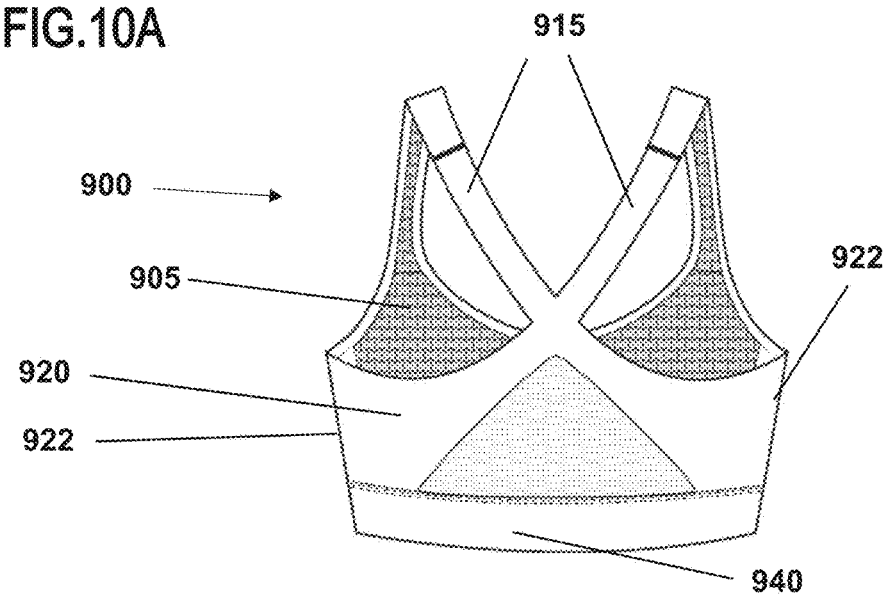
FIG. 10B is a rear view of the brassiere of FIG. 10A.

Referring to FIGS. 10A and 10B, a brassiere, also referred to as a sports bra 900, is depicted that includes a composite material 905 integrated within the textile material of the bra. The composite material 905 is similar to the composite material 100 as described herein and includes a first layer 110 and a second layer 120. The stitch network used to form cells in the composite material 905 of the bra 900 defines cells having auxetic shapes similar to those depicted in FIG. 6C (hour glass auxetic shapes).

The bra 900 includes a body and a pair of shoulder straps 915 extending from a front portion 910 to a rear portion 920. The front portion 910 is configured to generally span the front of the wearer's torso, while the rear portion 920 is configured to generally span the rear of the wearer's torso. The front and rear portions connect with each other via wing portions 922 that span either side of the wearer (under the arm). A neckline 930 extends along the front portion 910 between the shoulder straps 915. A bottom or under band 940 extends along the bottom edge of the body between the front and rear portions and is configured to encircle the torso of the wearer. A cup area 950 continuously spans the front portion 110 and is aligned and configured to span the breasts of the wearer. The cup area 950 can further include one or more pockets in which pads may be fitted to align with the breasts of the wearer (in order to provide comfort to the wearer when the bra is worn).

The composite material 905 can be integrated in the bra at any one or more suitable locations. Other portions of the bra that may not include the composite material can be formed of any textile materials suitable for a bra and formed via any suitable method and including any suitable one or more types of fibers or strands (e.g., elastic strands, non-elastic strands, polyester strands, nylon strands, etc.) such as the types described herein for forming the different layers of the composite material. In an example embodiment (as depicted in FIGS. 9A and 9B), the composite material 905 is integrated at the cup area 950 to enhance stretching, fit and comfort of the bra for the wearer. The dynamic action and static lockout action of the cells formed in the composite material 905 at a location where the composite material is stretched is similar to that described for the composite material 500 and depicted in FIGS. 7A-7C.

Figure 11:
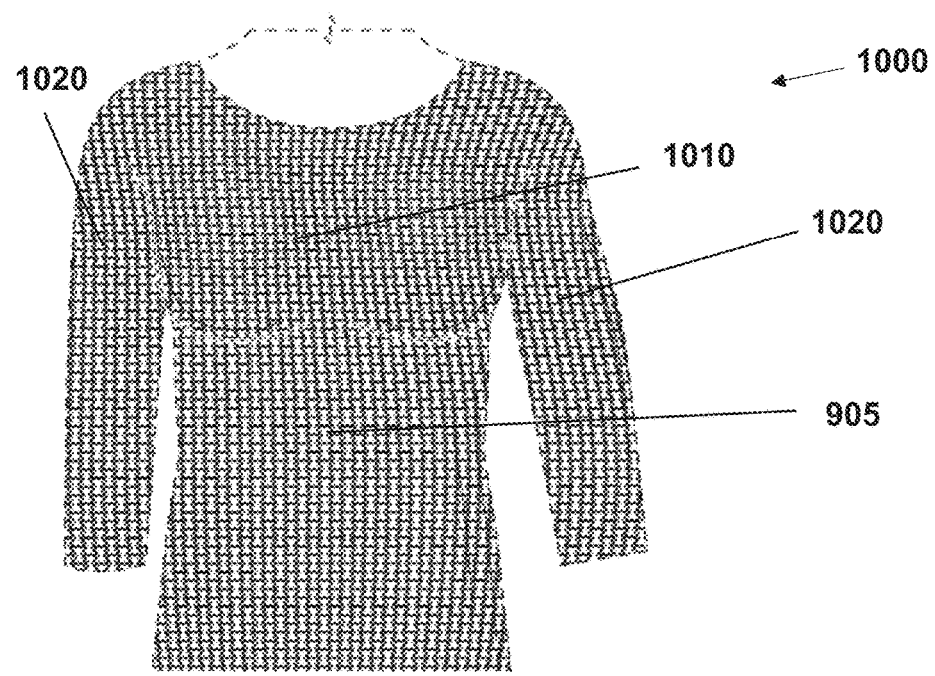
FIG. 11 is a view of an article of apparel (upper body garment) including a composite material formed in accordance with an embodiment of the present invention.

In another embodiment depicted in FIG. 11, an article of apparel that implements the composite material 905 is in the form of an upper body garment or shirt 1000 (e.g., an athletic shirt). The shirt 1000 includes a torso section 1010 (to fit around the torso of the wearer) and two arm sleeve sections 1020 (to fit around the arms of the wearer). The composite material 905 can be implemented at any portion of the shirt. For example, the composite material 905 can be used to form one or more portions of either arm sleeve section 1020 and/or the torso section 1010. The composite material 905 can further form a substantial portion of the shirt. Other portions of the shirt that may not include the composite material can be formed of any textile materials suitable for a shirt and formed via any suitable method and including any suitable one or more types of fibers or strands (e.g., elastic strands, non-elastic strands, polyester strands, nylon strands, etc.) such as the types described herein for forming the different layers of the composite material. The composite material 905 integrated in the shirt 1000 can provide enhanced stretching, fit and comfort for the wearer, where dynamic action and static lockout action of the cells formed in the composite material 905 at a location where the composite material is stretched is similar to that described for the composite material 500 and depicted in FIGS. 7A-7C.

Figure 12:
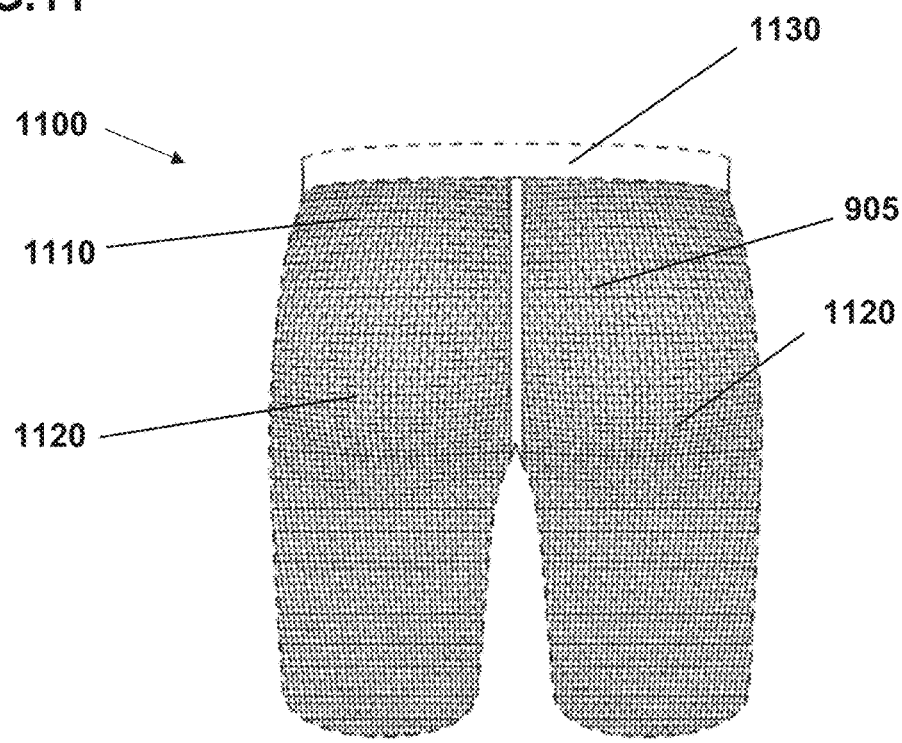
FIG. 12 is a view of an article of apparel (lower body garment) including a composite material formed in accordance with an embodiment of the present invention.

In a further embodiment depicted in FIG. 12, an article of apparel that implements the composite material 905 is in the form of lower body garment 1100 (e.g., leggings, pants or shorts). The lower body garment 1100 includes a main torso section 1110 that is configured to extend around the waist, hip and/or upper thigh regions of the wearer, and further two leg sleeve sections 1120 that extend from the main torso section 1110 and are configured to extend around some portion of the legs of the wearer. An elastic band 1130 can further be provided at an upper edge of the garment 1100 around the main torso section 1110. The composite material 905 can be implemented at any portion of the lower body garment. For example, the composite material 905 can be used to form one or more portions of either leg sleeve section 1120 and/or the main torso section 1110. The composite material 905 can further form a substantial portion of the lower body garment. Other portions of the lower body garment that may not include the composite material can be formed of any textile materials suitable for a lower body garment and formed via any suitable method and including any suitable one or more types of fibers or strands (e.g., elastic strands, non-elastic strands, polyester strands, nylon strands, etc.) such as the types described herein for forming the different layers of the composite material. The composite material 905 integrated in the lower body garment 1100 can provide enhanced stretching, fit and comfort for the wearer, where dynamic action and static lockout action of the cells formed in the composite material 905 at a location where the composite material is stretched is similar to that described for the composite material 500 and depicted in FIGS. 7A-7C.

Other embodiments incorporating a composite material as described herein are also possible. For example, any textile material product can incorporate the composite material as described herein to enhance the stretchable properties of the product.

While the invention has been described in detail and with reference to specific embodiments thereof, it will be apparent to one skilled in the art that various changes and modifications can be made therein without departing from the spirit and scope thereof.

For example, while the example embodiments depicted in the figures show an article of footwear (shoe) configured for a right foot, it is noted that the same or similar features can also be provided for an article of footwear (shoe) configured for a left foot (where such features of the left footed shoe are reflection or "mirror image" symmetrical in relation to the right footed shoe).

The composite material can be implemented in any textile article to enhance stretchability of the composite material at one or more locations independent of other locations of the material. The composite material includes at least one resilient layer capable having an elongation value in a dominant stretch dimension of the resilient layer that is at least 50%, preferably at least 100% or greater. One or more layers are secured to the resilient layer such that any degree of stretch associated with such layer(s) along the same dimension of the composite material that corresponds or is parallel with the dominant stretch dimension of the resilient layer will have an elongation value that is less than the elongation value of the resilient layer in its dominant stretch dimension.

The stitch network used to form cells can be formed via embroidery or any other suitable stitching process. The cells forming by the stitch network along layers of the composite material can have any suitable shapes depending upon a particular application for the composite material. In particular, while auxetic shapes can be useful for certain applications, other enclosed shapes for the cells formed by the stitch network are also possible (e.g., enclosed circles or enclosed oval patterns, intersecting wavy line patterns, etc.).

The stitch network along a composite material can also include cells having different shapes and/or different sizes at different areas of the composite material. For example, a stitch network can be provided along a composite material used to form an article of apparel (e.g., an upper of a shoe) that includes a first pattern of cells having a first shape (e.g., arrowhead auxetic shapes) at a first area of the composite material and a second pattern of cells have a second shape (e.g., hourglass auxetic shapes) at a second area of the composite material.

It is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed:

1. An article of apparel formed by:
    applying tension to a resilient textile layer, wherein the tension is sufficient to stretch the resilient textile;
    positioning a pliable textile layer on the resilient textile layer, wherein the pliable textile layer is positioned on the resilient textile layer in an unstretched configuration;
    securing the unstretched, pliable textile layer to the stretched, resilient textile layer via stitching;
    releasing the tension from the resilient textile layer to permit recovery of the textile toward an unstretched configuration, thereby forming a multilayered textile; and
    incorporating the multilayered textile into an article of apparel;
    wherein:
        the resilient textile layer defines a top surface and a bottom surface;
        the pliable textile layer defines a top surface and a bottom surface; and
        stitching includes positioning a top thread along the top surface of the pliable textile layer and a bobbin thread along the bottom surface of the resilient textile layer.

2. A composite material comprising:
    a first textile layer having a first elongation value;
    a second textile layer having a second elongation value that is greater than the first elongation value;
    a stitch network comprising stitching that secures the first textile layer with the second textile layer; and
    a plurality of cells defined at locations of the composite material at areas disposed within the stitch network and between the first textile layer and the second textile layer;
    wherein:
        in a relaxed state with no tension applied to the composite material, portions of the first textile layer located at the cells extend outward and away from the second textile layer; and
        in response to tension being applied by stretching the composite material along a first dimension, the portions of the first textile layer located at the cells collapse toward the second textile layer.

3. The composite material of claim 2, wherein the cells are interconnected along the stitch network such that adjacent cells share at least one stitch line of the stitching.

4. The composite material of claim 2, wherein at least some of the cells are enclosed cells defined by stitching of the stitch network that forms a cell perimeter around each enclosed cell.

5. The composite material of claim 4, wherein at least some of the enclosed cells have polygonal shapes.

6. The composite material of claim 4, wherein at least some of the enclosed cells have auxetic shapes.

7. The composite material of claim 2, wherein the second textile layer has an elongation value of at least 100% and a recovery value of at least 50%.

8. The composite material of claim 2, wherein:
    the first textile layer has a dominant stretch direction along the first textile layer that exhibits a greatest elongation value for the first textile layer;
    the second textile layer has a dominant stretch direction along the second textile layer that exhibits a greatest elongation value for the second textile layer; and
    the dominant stretch direction of the first textile layer is traverse the dominant stretch direction of the second textile layer.

9. The composite material of claim 2, further comprising:
    a third layer disposed between and secured with the first textile layer and the second textile layer.

10. The composite material of claim 9, further comprising:
    a fourth layer secured with the second layer so as to define an exterior surface of the composite material.

11. The composite material of claim 2, wherein the stitch network comprises embroidered stitching that secures the first textile layer with the second textile layer.

12. An article of apparel comprising the composite material of claim 2.

13. A brassiere comprising the composite material of claim 2.

14. An article of footwear comprising an upper and a sole structure, wherein the upper includes the composite material of claim 2.

15. The article of footwear of claim 14, the second textile layer has a dominant stretch direction along the second textile layer that exhibits a greatest elongation value for the second textile layer, and the composite material is incorporated within the upper such that the dominant stretch direction extends along a dimension of the upper that is transverse a longitudinal dimension of the upper.

16. A composite material comprising:
    a first textile layer including a top surface and a bottom surface, wherein the first textile layer possesses a greatest elongation value for the first textile layer in a first direction along the first textile layer;
    a second textile layer including a top surface and a bottom surface, wherein the second textile layer possesses a greatest elongation value for the second textile layer along a second direction of the second textile layer;
    a stitch network comprising stitching that secures the first textile layer with the second textile layer, wherein the stitching includes a top thread positioned along the top surface of the first textile layer and a bobbin thread positioned along the bottom surface of the second textile layer; and
    a plurality of cells defined at locations of the composite material at areas disposed within the stitch network and between the first textile layer and the second textile layer;
    wherein the first textile layer is oriented in relation to the second textile layer such that the first direction is transverse the second direction.

17. The composite material of claim 16, wherein the greatest elongation value for the second textile layer is greater than the greatest elongation value for the first textile layer.

18. The composite material of claim 16, wherein:
- in a relaxed state with no tension applied to the composite material, portions of the first textile layer located at the cells extend outward and away from the second textile layer; and
- in response to tension being applied by stretching the composite material along a first dimension, the portions of the first textile layer located at the cells collapse toward the second textile layer.

19. The composite material of claim 16, wherein at least some of the cells are enclosed cells defined by stitching of the stitch network that forms a cell perimeter around each enclosed cell.

20. The composite material of claim 19, wherein at least some of the enclosed cells have auxetic shapes.

* * * * *